Aug. 30, 1966 W. R. DICKIE 3,268,928
METHOD OF PRODUCING A SEPARABLE NUT
Original Filed Nov. 6, 1961
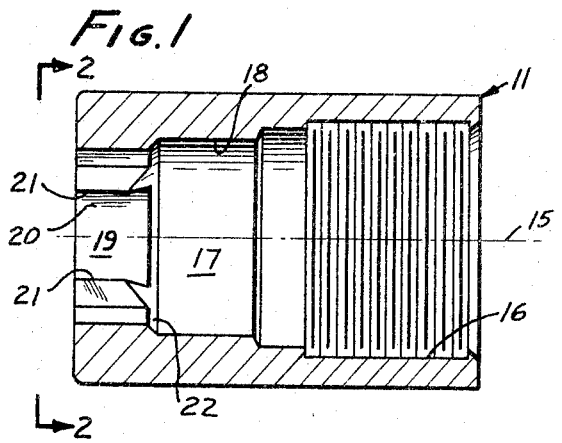
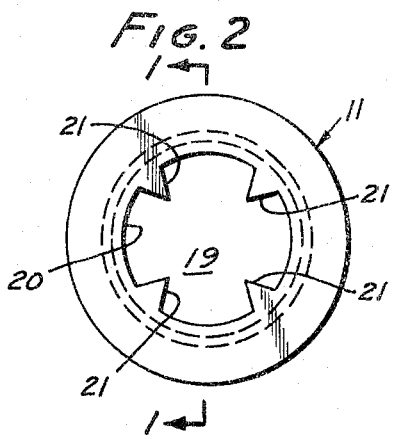
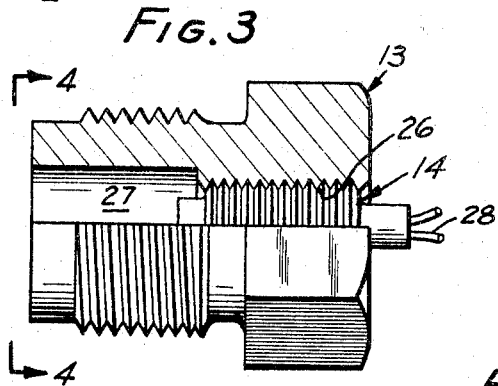
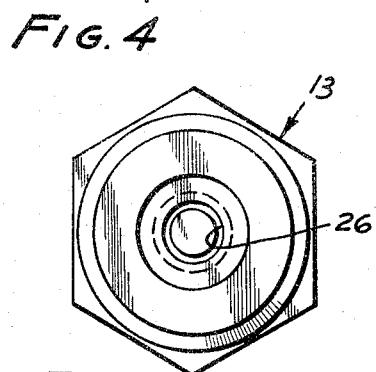
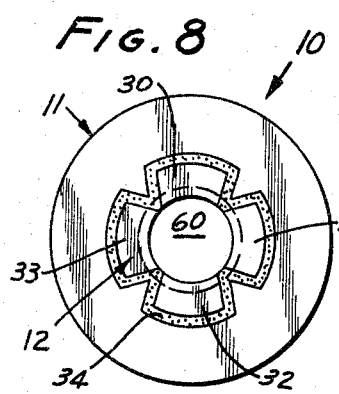
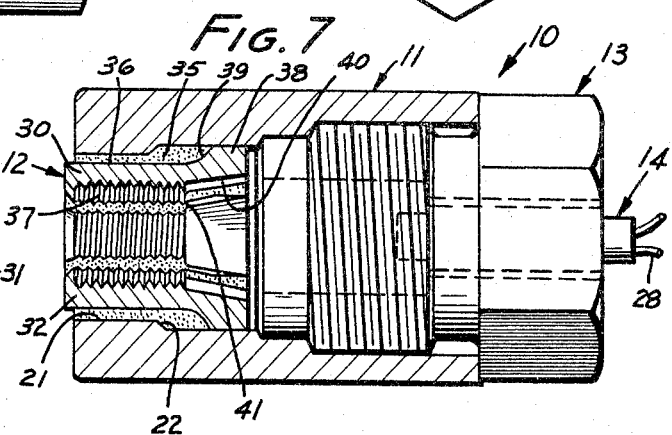
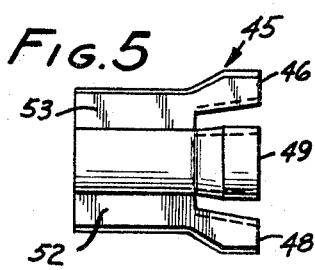
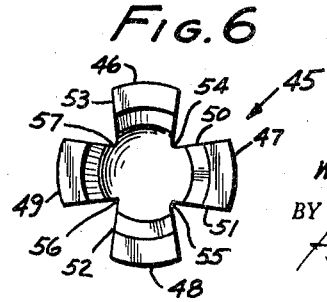
INVENTOR.
WILLIAM R. DICKIE
BY
ATTORNEYS.

United States Patent Office 3,268,928
Patented August 30, 1966

3,268,928
METHOD OF PRODUCING A SEPARABLE NUT
William R. Dickie, Manhattan Beach, Calif., assignor to Hi-Shear Corporation, Torrance, Calif., a corporation of California
Original application Nov. 6, 1961, Ser. No. 150,305, now Patent No. 3,176,573, dated Apr. 6, 1965. Divided and this application Oct. 12, 1964, Ser. No. 411,658
1 Claim. (Cl. 10—86)

This application is a division of applicant's co-pending patent application, Serial No. 150,305, filed November 6, 1961, entitled "Explosive Separable Nut," now United States Patent No. 3,176,573, issued April 6, 1965.

This invention relates to a separable nut adapted to make an engagement with a threaded shank member and to be separated therefrom by fluid force.

Separable nuts which include individual nut segments, each of which bears a fragment of a thread, and which are held together by a removable retainer, are known in the art. However, the problems left unsolved by the known devices are that they are difficult to manufacture, and are unreliable in operation, unless manufactured to very close tolerances, and with considerable complexity. Accordingly, explosively separable nuts have not been widely used except in applications where the absence of an alternative type of mechanism coupled with the need for high reliability in operation justified the use of an expansive item.

It is an object of this invention to provide a separable nut which is reliable in its operation, and which invention includes a new and novel means for making separable nuts which enables the device to be inexpensively and, at the same time, reliably manufactured. The invention thereby makes available to the manufacturing arts an economically feasible and reliable device, and promises to open up many new uses for separable nuts.

A separable nut according to this invention comprises a retainer with a chamber therein defined by an interior wall. An axial passage extends through this wall in communication with the chamber, the passage being defined by a boundary. There is a shoulder in the chamber adjacent to the passage.

A plurality of axially aligned and spaced apart nut segments is provided in the passage, and each of these segments includes a thread-bearing portion which carries a respective thread fragment. Each segment also includes a cam-bearing portion positioned inside the chamber which bears a cam surface adapted to strike the shoulder in order to cam the thread fragments off of engaging threads on a shank member to which the nut is attached in use.

There is a clearance between all adjacent ones of the nut segments and the passage boundary, and this clearance is filled with settable, extrudable, encapsulating material which holds the segments in position with the thread fragments arranged to receive the thread of a shank member.

A squib is provided in the chamber for releasing gases to build up pressure and for separating the nut which forces the cam surfaces toward the shoulder to carry out the aforesaid camming and release action.

Instead of an explosive squib, it is possible to utilize other types of devices, which can also properly be denoted as squibs in the sense that a fluid is self-contained at a point of use, and is suddenly released such as, for example, by provision of a $CO_2$ cartridge and a point for puncturing the same. This is a squib in the same sense as the explosive squib, because both devices quickly release gases from a self-contained source which is in fluid communication with the expansible chamber.

The method according to this invention for manufacturing the above device comprises providing an externally fluted element having a plurality of arms with axial striations between them; placing the element at least partially in the passage with clearance between it and the boundary; and then encapsulating it in that location with the said encapsulating material. After the encapsulating material has set, the central portion of the fluted element is drilled out and the resulting hole is thread-tapped, thereby forming a plurality of individual segments and, at the same time, cutting the respective thread fragments in the segments, which fragments will then lie in perfect alignment with each other.

The above and other features of this invention will be fully understood from the following detailed description and the accompanying drawings in which:

FIG. 1 is a cross-section of a portion of the presently preferred embodiment of the invention taken at line 1—1 of FIG. 2;
FIG. 2 is a left-hand end view of FIG. 1;
FIG. 3 is a side view partly in cutaway cross-section as still another part of the invention;
FIG. 4 is a left-hand end view of FIG. 3;
FIG. 5 is a side elevation of a fluted element forming an intermediate structural part in the manufacture of the device;
FIG. 6 is a right-hand end view of FIG. 5;
FIG. 7 is a side elevation partly in cutaway cross-section showing the presently preferred embodiment of the invention; and
FIG. 8 is a left-hand end view of FIG. 7.

A separable nut 10 according to the invention is best shown in FIGS. 7 and 8. Its principal parts include a retainer 11, a nut 12, a plug 13, and a squib 14.

In FIG. 1, retainer 11 is shown in detail. It has a central axis 15 at one end of which a port 16 opens into a chamber 17. The chamber is defined by an interior wall 18. A passage 19 extends axially through the interior wall, and is defined by a boundary 20. Axially-extending teeth 21 project into the passage from the boundary.

A shoulder 22 is disposed in the chamber adjacent to the passage.

An externally-threaded plug 13 is adapted to be threaded into port 16 to close the right-hand end of the chamber. A threaded hole 26 extends axially through the plug to receive and hold squib 14, the squib being adapted to discharge gases into a bore 27 in the plug, which in turn is in fluid communication with the chamber. The squib has leads 28 for conducting firing current thereto.

As best shown in FIGS. 7 and 8, nut 12 comprises four segments 30, 31, 32, 33 which are radially spaced apart from each other and are axially aligned, a portion of each of them standing in the passage, and another portion standing in the chamber. Besides being spaced apart from each other, the segments are also spaced from boundary 20 and from the teeth so that there is a continuous peripheral clearance 34 between the boundary, teeth and segments.

Clearance 34 is filled with an extrudable, settable, encapsulating material 35. The presently preferred material is di-allyl phthalate molding compound, mineral filled, preferably with an asbestos filler. This material will set hard enough to resist torque force but, under pressure, is extrudable for purposes which will later become evident. Encapsulating material 35 serves to hold segments 30–33 in place, and forms a gas-seal around the segments.

Each individual segment, of which segment 30 is typical and shown in detail, includes a thread-bearing portion 36 which carries a thread fragment 37 on its inside surface and a cam-bearing portion 38 with an external cam surface 39 thereon. Cam surface 39 is a fragment of a conical frustum. It overhangs, and is adapted to strike shoulder 22. A relief 40 is formed inside the cam-bearing portion. The relief forms a junction 41 with the thread fragments, which junction acts as a fulcrum in a manner later to be described.

The construction of the completed nut is shown in FIGS. 7 and 8 and should be evident from the above. The method of constructing this nut, which is a feature of the invention, will be best understood by consideration of FIGS. 5 and 6, which both show an externally fluted element 45 with four arms, 46, 47, 48, 49. These arms will be formed into segments 30–33, respectively. This fluted element is easily formed by turning it on a lathe and then cutting axial notches 50, 51, 52, 53 which have root lines 54, 55, 56, 57, respectively. This fluted element is placed inside the retainer and held in the position shown in FIG. 7. Then the encapsulating material is placed as shown in FIGS. 7 and 8 and permitted to set. The fluted element is thereby firmly held against rotation, the teeth serving to hold the encapsulating material against rotation and this resistance is, of course, transmitted to the segments themselves.

Now it is possible to drill an axial hole through the center portion of the fluted element, the hole having a diameter at least great enough to cut out to the root lines of the fluted element, thereby separating the structure into four segments. Thereafter the thread fragments can be tapped to form holes 60, and the device is complete. That part of the encapsulating material which lies contiguous to the thread fragments is simultaneously thread-tapped, and serves as a gas-seal between the segments. The rest of the encapsulating material seals between the segments and the boundaries.

The great simplification of this method of construction over previously-required careful assembly and machining techniques for retainer bands, retainer rings, and the like, the necessary precision of all of which contributed greatly to the expense of manufacturing the device, is evident. This manufacturing technique is as simple as potting an element, and drilling out and tapping a part of it.

In operation, a threaded end of a shank member is threaded into tapped hole 60 in the nut and thereby completely closes chamber 17. The separable nut acts as a nut for engagement to a shank member until separation is desired. Separation is accomplished by firing the squib. This releases gases under pressure into the chamber which, as soon as sufficient pressure is generated, begins moving the segments to the left in FIG. 7 relative to the retainer. Of course this motion is relative and the segments might be held still while the retainer moves to the right. Some of the encapsulating material is extruded from the passage, enabling the relative motion of the segments and retainer to take place. After sufficient movement, the cam surfaces strike shoulder 22, and additional movement presses the cam-bearing portions of the segments axially inward toward the shank member, junction 41 acting as a fulcrum. This lifts the thread fragments off the threaded shank member, thereby releasing the same. Relief 40 is smooth and will not interfere with the threads on the shank as it moves away. What happens to the segments after this point is immaterial. Often they will be held loosely in the retainer by the encapsulating material, but this is not necessary, because they are of no further use.

This device is reliable, easily and relatively inexpensively manufactured, and suitable for commercial usages where separable fasteners have never heretofore been feasible because of their relatively greater expense.

This invention is not to be limited by the embodiment shown in the drawings and described in the description which is given by way of example and not of limitation but only in accordance with the scope of the appended claim.

I claim:

A method for making a separable fastener of the class which includes a retainer having a chamber defined by an internal wall, a passage through the wall defined by a boundary, and a plurality of nut segments each of which bears a thread fragment for engagement to a threaded shank member, comprising: positioning an externally fluted element in the passage, with a complete peripheral clearance between the boundary and the peripheral surface of the element, encapsulating at least a portion of the element by filling the clearance with an extrudable settable encapsulating material, allowing the material to set, drilling out the center of the fluted element to leave spaced apart, disconnected segments set in the encapsslating material, and then tapping a thread in said hole to form the thread fragments on the segments.

References Cited by the Examiner
UNITED STATES PATENTS 2,286,336 6/1942 Brooke _____ 10—86
2,480,966 9/1949 Richardson et al. _____ 10—86 X ANDREW R. JUHASZ, *Primary Examiner.*